(12) United States Patent
Lin (10) Patent No.: US 11,632,688 B2
(45) Date of Patent: Apr. 18, 2023

(54) NETWORK DEVICE AND UPLINK DATA TRANSMISSION METHOD THEREFOR

(71) Applicant: Cortina Access, Inc., San Jose, CA (US)

(72) Inventor: MeiYao Lin, San Jose, CA (US)

(73) Assignee: REALTEK SINGAPORE PTE LTD., Singapore (SG)

( * ) Notice: Subject to any disclaimer, the term of this patent is extended or adjusted under 35 U.S.C. 154(b) by 113 days.

(21) Appl. No.: 17/376,657

(22) Filed: Jul. 15, 2021

(65) Prior Publication Data
US 2023/0013234 A1   Jan. 19, 2023

(51) Int. Cl.
*H04W 24/10* (2009.01)
*H04W 28/06* (2009.01)
*H04W 68/00* (2009.01)

(52) U.S. Cl.
CPC ........... *H04W 24/10* (2013.01); *H04W 28/06* (2013.01); *H04W 68/00* (2013.01)

(58) Field of Classification Search
CPC ...... H04W 24/10; H04W 28/06; H04W 68/00
USPC ......................................................... 370/252
See application file for complete search history.

(56) References Cited

U.S. PATENT DOCUMENTS

| 8,639,625 | B1* | 1/2014 | Ginter | ................ H04N 21/4405 |
| | | | | 705/50 |
| 11,334,303 | B1* | 5/2022 | Duggan | ................ G06F 3/1205 |

FOREIGN PATENT DOCUMENTS

RU        2551602        *  5/2015

* cited by examiner

*Primary Examiner* — Christopher R Crompton
(74) *Attorney, Agent, or Firm* — McClure, Qualey & Rodack, LLP (57) ABSTRACT

An uplink data transmission method includes a report procedure. The report procedure includes: obtaining a start page number according to a page queue header of a page queue, where the page queue has a plurality of page records in sequence, the start page number corresponds to one of the page records, each of the page records includes a page size, and the page size is a sum of data sizes of packets corresponding to the page record; summing the page size of the page record corresponding to the start page number and the page size of each of the subsequent page records one by one to calculate a first sum result; and outputting the first sum result as a report size.

20 Claims, 8 Drawing Sheets

---

Obtain a start packet number according to a packet queue header — S400

Sum a data size of a single packet record corresponding to the start packet number and a data size of each of subsequent single packet records one by one to calculate a second sum result, until a data size of a single packet record corresponding to a subsequent-page indicator corresponding to a start page number — S402

Sum the second sum result and a page size of each of page records subsequent to a page record corresponding to the start page number one by one to calculate a first sum result — S404

NETWORK DEVICE AND UPLINK DATA TRANSMISSION METHOD THEREFOR

BACKGROUND

Technical Field

The present invention relates to communication data transmission technologies, and in particular, to a network device and an uplink data transmission method.

Related Art

Generally, communication transmission includes uplink transmission and downlink transmission. During point-to-multipoint communication transmission (for example, in a passive optical network (PON)), the downlink transmission means that a line terminal continuously transmits data to a plurality of network units. The uplink transmission means that a plurality of network units transmit data to the line terminal. Each of the network units may only transmit the data in a time slot assigned by the line terminal, to avoid mutual interference between the network units during the uplink transmission. The passive optical network is an optical fiber communication network including an optical line terminal (OLT), an optical network unit (ONU), and an optical distribution network (ODN).

Generally, during the downlink transmission, the line terminal transmits an allowable data amount and assign a time slot to each of the network units. In order to enable each of the network units to quickly upload all stored data, in addition to transmit data of a current amount allowed by the line terminal, the network unit further needs to report an amount of remaining to-be-uploaded data to the line terminal in the uplink transmission time slot. However, a time period between a time point at which the network unit receives information such as an allowable data amount, an assigned time slot, and the like from the line terminal and a time point at which the assigned time slot starts is generally short (which is merely a few nano-seconds, for example). Therefore, the network unit needs to quickly calculate an uplink transmission data amount and an amount of all remaining to-be-uploaded data during the time period, so as to increase overall performance of the data transmission technology.

SUMMARY

In view of the above, the present invention provides a network device and an uplink data transmission method therefor. According to some embodiments, the present invention can quickly calculate the amount of uplink transmission data and the remaining amount of data to be uploaded in a short period of time.

According to some embodiments, the data uplink transmission method includes: performing a report procedure. The report procedure includes: obtaining a start page number according to a page queue header of a page queue, where the page queue has a plurality of page records in sequence, the start page number corresponds to one of the page records, each of the page records includes a page size, and the page size is a sum of data sizes of packets corresponding to the page record; summing the page size of the page record corresponding to the start page number and the page size of each of the subsequent page records one by one to calculate a first sum result; and outputting the first sum result as a report size.

According to some embodiments, the network device includes a controller. The controller stores a page queue. The page queue includes a page queue header and a plurality of page records in sequence. Each of the page records includes a page size. The page size is the sum of the data sizes of the packets corresponding to the page record. The controller is configured to perform a report procedure. The report procedure includes: obtaining a start page number according to a page queue header, where the start page number corresponds to one of the page records; summing the page size of the page record corresponding to the start page number and the page size of each of the subsequent page records one by one to calculate a first sum result; and outputting the first sum result as a report size.

In conclusion, according to some embodiments, by summing the page sizes (for example, a plurality of single packets are classified into a plurality of packet groups, and summation is performed in a unit of one packet group), an amount of remaining to-be-uploaded data can be quickly calculated, to ensure that a next allowable data amount of a link terminal is sufficient, thereby improving uplink transmission efficiency of the network device. In some embodiments, when a quantity of single packets in the packet group does not reach an upper limit (which is referred to as a preset full threshold below), data sizes of the single packets may be summed (for example, summation is performed in a unit of one single packet), so that a time required to calculate the amount of to-be-uploaded data can be shortened.

DETAILED DESCRIPTION

Figure 1:
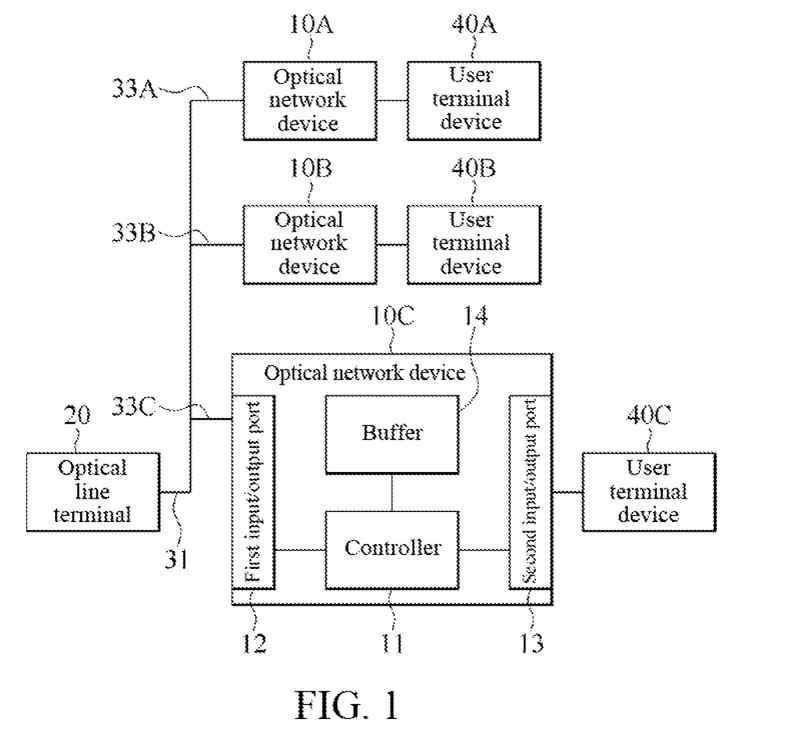
FIG. 1 illustrates a schematic application diagram of an optical network device according to some embodiments.

The present invention is adapted to a point-to-multipoint communication transmission structure. For ease of description, a passive optical network is exemplified to illustrate features of the present invention, which is not a limitation on the present invention. The passive optical network is an optical fiber communication network including an optical line terminal, an optical network unit, and an optical distribution network. Referring to FIG. 1, FIG. 1 illustrates a schematic application diagram of optical network devices 10A-10C according to some embodiments. The optical line terminal 20 is electrically connected to a main optical fiber 31, and the plurality of optical network devices 10A-10C are respectively electrically connected to corresponding optical sub-fibers 33A-33C and corresponding user terminal devices 40A-40C. The main optical fiber 31 and the optical sub-fibers 33A-33C may be said optical distribution network, and the optical network devices 10A-10C may be said optical network unit. In some embodiments, the main optical fiber 31 and the optical sub-fibers 33A-33C are one-to-many optical couplers, optical splitters, or optical combiners. The optical line terminal 20 is electrically connected to the optical network devices 10A-10C via the main optical fiber 31 and the optical sub-fibers 33A-33C, to achieve the communication transmission between a single point (the optical line terminal 20) and a plurality of points (the optical network devices 10A-10C). The optical line terminal 20 is configured to assign an authorization message and a time slot applicable to uplink transmission to each of the optical network devices 10A-10C. The authorization message includes an authorized size. The authorized size is an amount of data that is allowed by the optical line terminal 20 for the optical network devices 10A-10C to transmit in the uplink transmission time slot. In some embodiments, the user terminal devices 40A-40C are desktop computers, notebook computers, servers, or the like.

As shown in FIG. 1, each of the optical network devices 10A-10C includes a controller 11. For ease of description, only a detailed circuit block diagram of the optical network device 10C is shown in FIG. 1. The controller 11 is configured to perform a report procedure, an authorized uploading procedure, and a packet receiving procedure. The controller 11 may be an operational circuit such as a central processing unit, a microprocessor, an application specific integrated circuit, an embedded system, a system-on-a-chip, or the like. In some embodiments, the optical network devices 10A-10C each further include a first input/output port 12 and a second input/output port 13. The first input/output port 12 is electrically connected to the optical line terminal 20 via a corresponding one of the optical sub-fibers 33A-33C and the main optical fiber 31. The second input/output port 13 is electrically connected to a corresponding one of the user terminal devices 40A-40C. The first input/output port 12 is configured to perform transmission with the optical line terminal 20. For example, during downlink transmission, the first input/output port 12 receives an authorization message and an assigned time slot from the optical line terminal 20. In an uplink transmission time slot, the first input/output port 12 outputs data (that is, a packet) that satisfies or is less than the authorized size to the optical line terminal 20. In addition, the first input/output port 12 also outputs an amount of remaining to-be-uploaded data (which is referred to as a report size below) to the optical line terminal 20 in the uplink transmission. The second input/output port 13 is configured to perform transmission with a corresponding one of the user terminal devices 40A-40C. For example, the second input/output port 13 receives a packet from the corresponding one of the user terminal devices 40A-40C.

Figure 2:
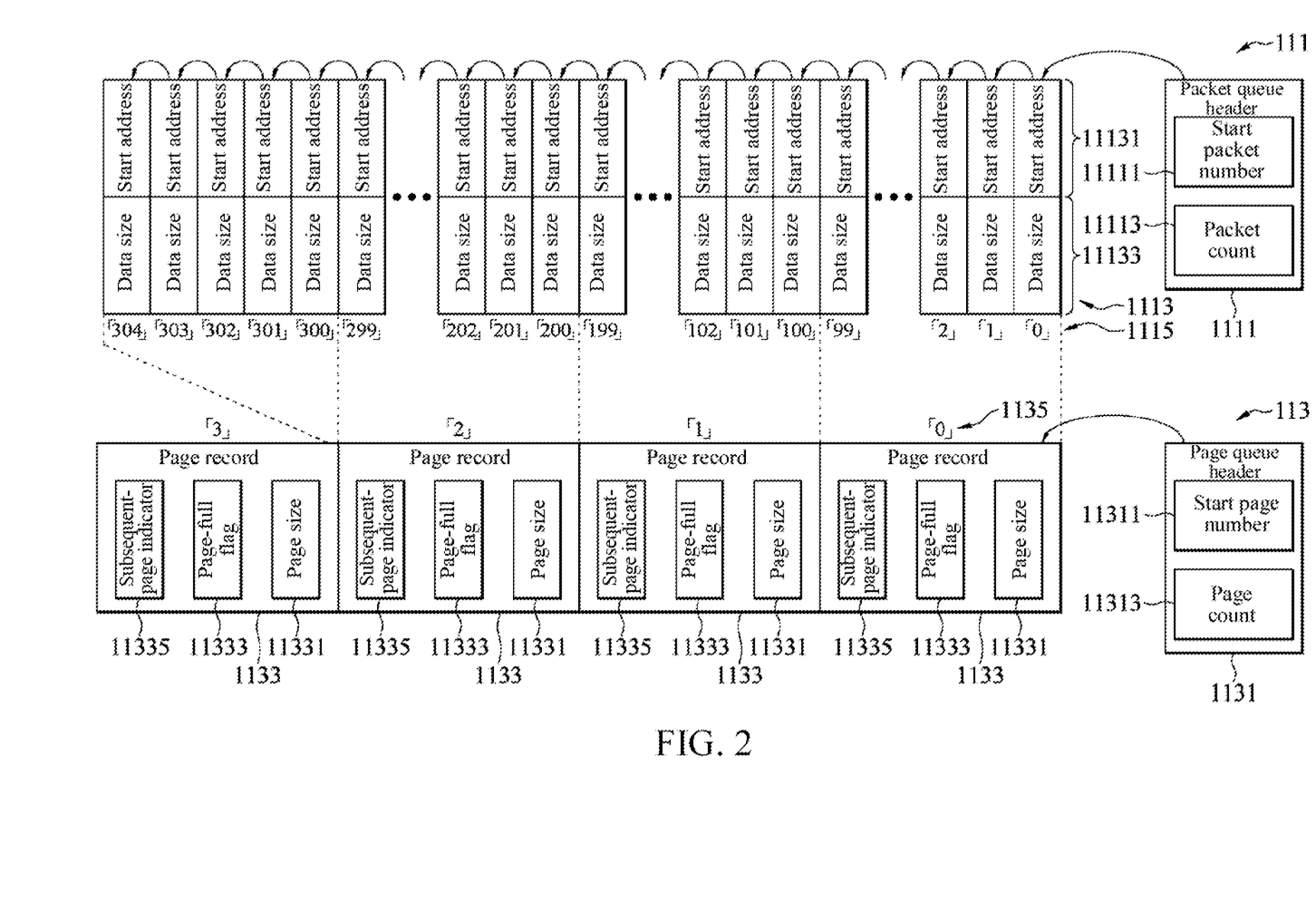
FIG. 2 illustrates a schematic diagram of a packet queue and a page queue according to some embodiments.

Referring to FIG. 2, FIG. 2 illustrates a schematic diagram of a packet queue 111 and a page queue 113 according to some embodiments. The controller 11 stores the page queue 113. The page queue 113 includes a page queue header 1131 and a plurality of page records 1133 in sequence. The page records 1133 may be distinguished from each other by using a page number 1135. For example, a page number "0" is a first page record, a page number "1" is a second page record, and so on. In some embodiments, the controller 11 further stores the packet queue 111. The packet queue 111 includes a packet queue header 1111 and a plurality of single packet records 1113 in sequence. Each of the single packet records 1113 is configured to store relevant data of a different packet. The single packet records 1113 may be distinguished from each other by using a packet number 1115. For example, a packet number "0" is a first single packet record, a packet number "1" is a second single packet record, and so on. In some embodiments, an order of the single packet records 1113 and an order of the page records 1133 may be arranged according to an order in which the controller 11 receives packets from the corresponding user terminal devices 40A-40C.

Each of the single packet records 1113 includes a data size 11133 of a different packet. Each of the page records 1133 includes a page size 11331. The page size 11331 is a sum of the data sizes 11133 of the packets corresponding to the page record 1133. For example, as shown in FIG. 2, the first page record (the page record 1133 having a page number 1135 of "0") corresponds to a first packet to a $100^{th}$ packet, that is, the first page record corresponds to the first single packet record (a single packet record 1113 having a packet number 1115 of "0") to a $100^{th}$ single packet record (a single packet record 1113 having a packet number 1115 of "99"). The page size 11331 of the first page record is a sum of the data size 11133 of the first single packet record to the data size 11133 of the $100^{th}$ single packet record.

Figure 3:
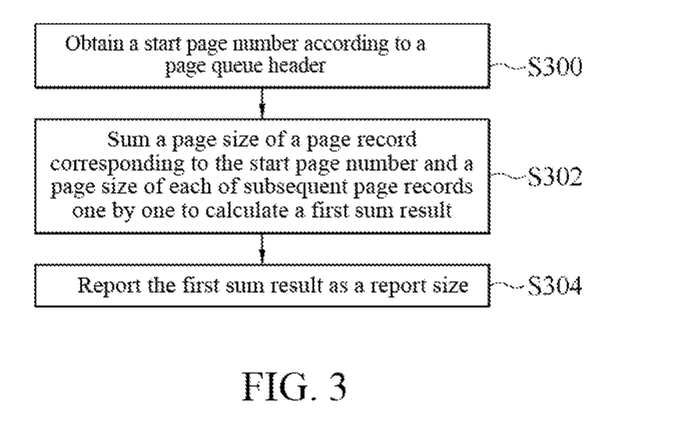
FIG. 3 illustrates a schematic flowchart of a report procedure according to some embodiments.

Referring to FIG. 3, FIG. 3 illustrates a schematic flowchart of a report procedure according to some embodiments. In the report procedure, first, the controller 11 obtains a start page number 11311 according to the page queue header 1131 (step S300). The start page number 11311 corresponds to one of the page records 1133. Specifically, the start page number 11311 corresponds to the first to-be-uploaded page record. For example, as shown in FIG. 2, assuming that the start page number 11311 is "0", the first to-be-uploaded page record is the page record 1133 having a page number 1135 of "0".

Then, the controller 11 sums the page size 11331 of the page record 1133 corresponding to the start page number 11311 and the page size 11331 of each of the subsequent page records 1133 one by one to calculate a first sum result 50 (step S302). After that, the controller 11 uses the first sum result 50 as the report size, and outputs the report size to the optical line terminal 20 in the uplink transmission time slot (step S304). For example, as shown in FIG. 2, assuming that the start page number 11311 is "0", the controller 11 sums the page size 11331 of the page record 1133 having the page number 1135 of "0" and the page size of each of the subsequent page records one by one until the page size 11331 of a last one of the page records 1133 in the page queue 113 (for example, the page size 11331 of the page record 1133 having a page number 1135 of "3"), to calculate the first sum result 50 as the report size. Therefore, the report size can be quickly calculated by using the page size as a unit (that is, by using a packet group as a unit) compared with using a data size of a single packet as a unit.

Referring to FIG. 2, in some embodiments, each of the page records 1133 further includes a page-full flag 11333 and a subsequent-page indicator 11335. The page-full flag 11333 is configured to define whether a quantity of packets (or a quantity of single packet records 1113) corresponding to the page record 1133 reaches a preset full threshold. If the preset full threshold is reached, the page-full flag 11333 is a full value (for example, a logic "1"). If the preset full threshold is not reached, the page-full flag 11333 is an underfull value (for example, a logic "0"). For example, as shown in FIG. 2, it is assumed that the preset full threshold is "100". Since there are only single packet records 1113 having packet numbers of "300" to "304" (that is, a quantity of single packet records 1113 corresponding to the page record 1133 having the page number "3" does not reach the preset full threshold), the page-full flag 11333 of the page record 1133 having the page number "3" is an underfull value. In another example, assuming that packets corresponding to single packet records 1113 having packet numbers of "0" to "49" have been outputted to the optical line terminal 20 in a previous uplink transmission time slot (that is, part of packets corresponding to the page record 1133 having the page number "0" have been outputted, and therefore the current page record 1133 having the page number "0" corresponds to only single packet records 1113 having packet numbers of "50" to "99", which fail to reach the preset full threshold), the page-full flag 11333 of the page record 1133 having the page number "0" is an underfull value.

Each of the subsequent-page indicators 11335 corresponds to one of the single packet records 1113. Specifically, the subsequent-page indicator 11335 is configured to define a start single packet record of the subsequent page records 1133 (that is, a single packet record 1113 ranked first in the sequential single packet records 1113 corresponding to the subsequent page record 1133). For example, as shown in FIG. 2, a start single packet record of the page record 1133 having the page number "1" is a single packet record 1113 having a packet number "100". A subsequent-page indicator 11335 of the page record 1133 having the page number "0" corresponds to the single packet record 1113 having the packet number "100".

Figure 4:
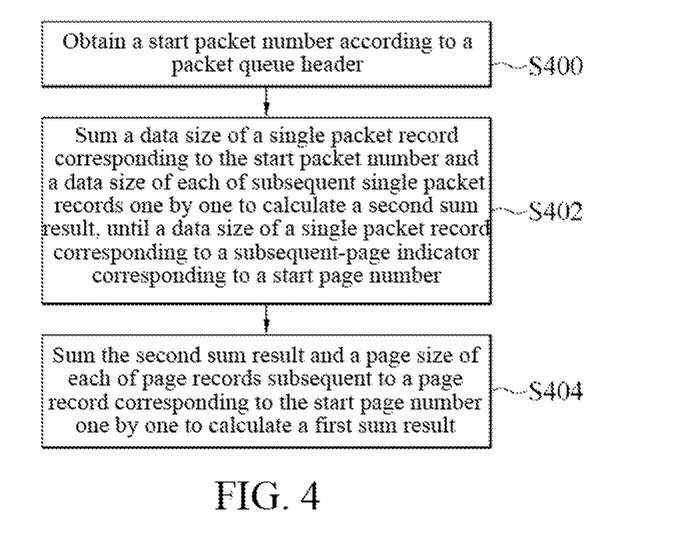
FIG. 4 illustrates a schematic flowchart of a report procedure according to some embodiments.

Referring to FIG. 4, FIG. 4 illustrates a schematic flowchart of a report procedure according to some embodiments. In some embodiments, in the report procedure, the controller 11 further obtains a start packet number 11111 according to the packet queue header 1111 (step S400). The start packet number 11111 corresponds to one of the single packet records 1113. Specifically, the start packet number 11111 corresponds to a first to-be-uploaded single packet record 1113. For example, as shown in FIG. 2, assuming that the start packet number 11111 is "0", the to-be-uploaded first single packet record 1113 is the single packet record 1113 having the packet number 1115 of "0".

When the page-full flag 11333 corresponding to the start page number 11311 is an underfull value, the controller 11 sums the data size 11133 of the single packet record 1113 corresponding to the start packet number 11111 and the data size 11133 of each of the subsequent single packet records 1113 one by one to calculate a second sum result, until the data size 11133 of the single packet record 1113 corresponding to the subsequent-page indicator 11335 corresponding to the start page number 11311 (step S402). For example, as shown in FIG. 2, assuming that the start page number 11311 is "0", and the start packet number 11111 is "50" (that is, packets corresponding to single packet records 1113 having the packet numbers "0"-"49" have been outputted in a previous uplink transmission time slot), the controller 11 sums the data size 11133 of the single packet record 1113 having the packet number 1115 of "50" and the data size of each of the subsequent single packet records one by one until the data size 11133 of the single packet record 1113 having a packet number 1115 of "99", to calculate the second sum result. In other words, the summation stops before the data size 11133 of the single packet record 1113 having the packet number 1115 of "100" (that is, the data size 11133 of the single packet record 1113 corresponding to the subsequent-page indicator 11335 corresponding to the start page number 11311), to calculate the second sum result.

Compared with step S302, in step S404, the controller 11 sums the second sum result and the page size 11331 of each of the page records 1133 subsequent to the page record 1133 corresponding to the start page number 11311 one by one to calculate the first sum result 50. For example, as shown in FIG. 2, assuming that the start page number 11311 is "0", the controller 11 sums the second sum result and the page size 11331 of the page record 1133 having the page number 1135 of "1" until the page size 11331 of the last one of the page records 1133 in the page queue 113 (for example, the page record 1133 having the page number 1135 of "3"), to calculate the first sum result 50.

Referring again to FIG. 2, in some embodiments, the controller 11 accumulates a page count 11313. The page count 11313 may be stored in the page queue header 1131. The page count 11313 is configured to accumulate a quantity of page records 1133 in the page queue 113. In other words, the page count 11313 is configured to define the last one of the page records 1133 in the page queue 113. For example, as shown in FIG. 2, it is assumed that the page count 11313 is "$11000010 0|_{BIN}$". A bit value (which is referred to as a first bit value below) of two bits enumerated from a most significant bit represents the page number 1135, and a bit value (which is referred to as a second bit value below) of seven remaining bits represents a quantity of packets (or a quantity of single packet records 1113) corresponding to a page record 1133 having a page number 1135 of "$3|_{DEC}$". In other words, it means that the page queue 113 includes four page records 1133, and the page count 11313 corresponds to the page record 1133 having the page number 1135 of "3".

Figure 5:
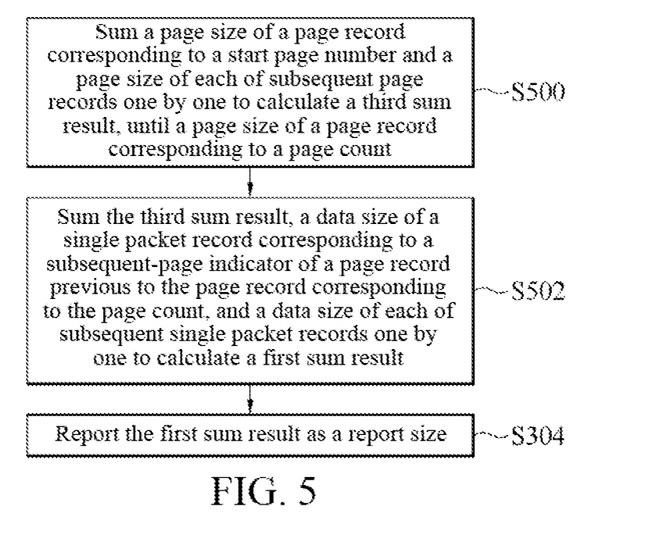
FIG. 5 illustrates a schematic flowchart of a report procedure according to some embodiments.

Referring to FIG. 5, FIG. 5 illustrates a schematic flowchart of a report procedure according to some embodiments. In some embodiments, in the report procedure, the controller 11 performs step S500 and step S502. Compared with step S302, in step S500, when the page-full flag 11333 of the page record 1133 corresponding to the page count 11313 is an underfull value, the controller 11 sums the page size 11331 of the page record 1133 corresponding to the start page number 11311 and the page size 11331 of each of the subsequent page records 1133 one by one to calculate a third sum result, until the page size 11331 of the page record 1133 corresponding to the page count 11313. For example, as shown in FIG. 2, assuming that the start page number 11311 is "0", and the page count 11313 is "$110000100|_{BIN}$", the controller 11 sums the page size 11331 of the page record 1133 having the page number 1135 of "0" and the page size 11331 of each of the subsequent page records one by one, until the page size 11331 of the page record 1133 having a page number 1135 of "2", to calculate the third sum result. In other words, the summation stops before the page size 11331 of the page record 1133 having the page number 1135 of "3" (that is, the page size 11331 of the page record 1133 corresponding to the page count 11313), to calculate the third sum result.

Next, in step S502, the controller 11 sums the third sum result, the data size 11133 of the single packet record 1113 corresponding to the subsequent-page indicator 11335 of the page record 1133 previous to the page record 1133 corresponding to the page count 11313, and the data size 11133 of each of the subsequent single packet records 1113 one by one to calculate the first sum result 50. For example, as shown in FIG. 2, assuming that the page count 11313 is "$110000100|_{BIN}$", the page count 11313 corresponds to the page record 1133 having the page number 1135 of "3", and the subsequent-page indicator 11335 of the page record 1133 (that is, the page record 1133 having the page number 1135 of "2") previous to the page record corresponds to the single packet record 1113 having a packet number 1115 of "300". Therefore, the controller 11 sums the third sum result and the data size 11133 of the single packet record 1113 having the packet number 1115 of "300", until the data size 11133 of a last one of the single packet records 1113 in the packet queue 111 (for example, the single packet record 1113 having a packet number 1115 of "304"), to calculate the first sum result 50.

When a quantity of packets (or a quantity of single packet records 1113) corresponding to the page record 1133 does not reach the preset full threshold, the report size may be quickly calculated by performing summation by using the data size 11133 of the single packet as a unit. However, the present invention is not limited thereto. In some embodiments, the page size 11331 may be updated in real time according to the quantity of packets (or the quantity of single packet records 1113) corresponding to the page record 1133. Therefore, when the quantity of packets (or single packet records 1113) corresponding to the page record 1133 does not reach the preset full threshold, the report size may be calculated by summing the page sizes 11331.

Figure 6:
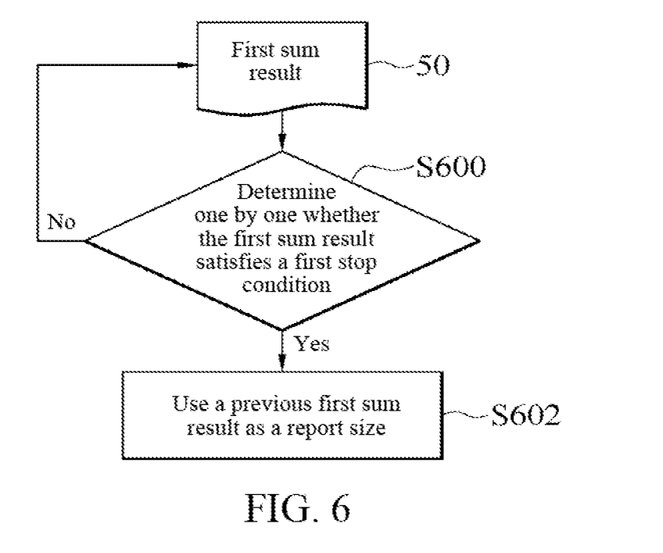
FIG. 6 illustrates a schematic flowchart of a report procedure according to some embodiments.

Referring to FIG. 6, FIG. 6 illustrates a schematic flowchart of a report procedure according to some embodiments. In some embodiments, when the first sum result 50 is calculated one by one, the controller 11 determines one by one whether the first sum result 50 satisfies a first stop condition (step S600). If the first stop condition is not satisfied, the controller 11 continues to perform step S302, S404, or S502 to calculate a new first sum result 50. If the first stop condition is satisfied, the controller 11 uses a previous first sum result 50 as the report size (step S602). The first stop condition includes the first sum result 50 being greater than a size threshold. The size threshold is a maximum report amount allowed for the optical network devices 10A-10C during each report. The maximum report amount may conform with passive optical network communication specifications. In this way, the report size can be the closest or equal to the maximum report amount. In some embodiments, the first stop condition may include that a difference between the first sum result 50 and the authorized size is greater than the size threshold, for example, the first sum result 50 minus the authorized size is greater than the size threshold.

In some embodiments, if a sum of the data sizes 11133 of all of the single packet records 1113 in the packet queue 111 or a sum of the page sizes 11331 of all of the page records 1133 in the page queue 113 is not greater than the size threshold, the controller 11 outputs the sum of all of the data sizes 11133 or the sum of all of the page sizes 11331 as the report size.

Figure 7:
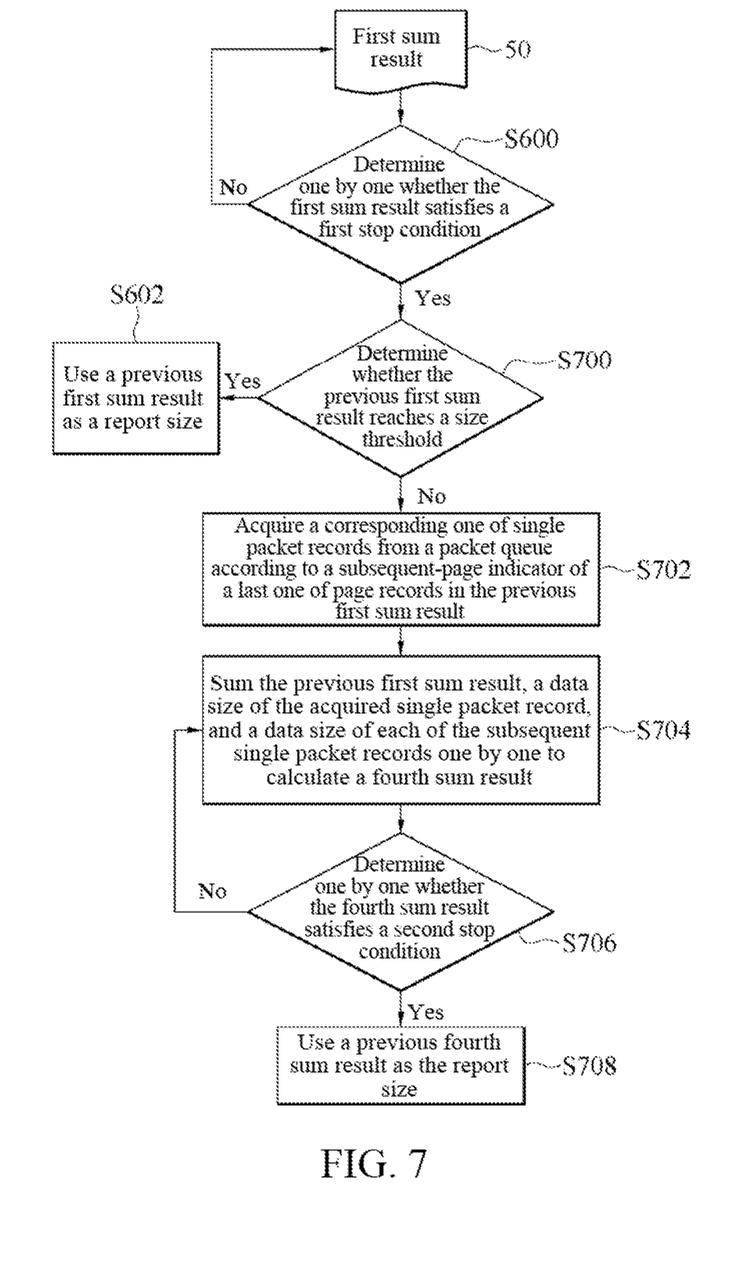
FIG. 7 illustrates a schematic flowchart of a report procedure according to some embodiments.

Referring to FIG. 7, FIG. 7 illustrates a schematic diagram of a report procedure according to some embodiments. In some embodiments, when the first stop condition is satisfied, the controller 11 determines whether a previous first sum result reaches the size threshold (step S700). If the previous first sum result reaches the size threshold, the controller 11 performs step S602. If the previous first sum result 50 does not reach the size threshold, the controller 11 acquires a corresponding one of the single packet records 1113 from the packet queue 111 according to the subsequent-page indicator 11335 of a last one of the page records 1133 in the first sum result 50 (step S702). For example, as shown in FIG. 2, when the first stop condition is satisfied and the previous first sum result 50 does not reach the size threshold, assuming that the previous first sum result 50 is obtained when the summation proceeds to the page size 11331 of the page record 1133 having the page number 1135 of "1", the subsequent-page indicator 11335 of the page record 1133 having the page number 1135 of "1" corresponds to the single packet record 1113 having a packet number 1115 of "200". Therefore, the controller 11 acquires the single packet record 1113 having the packet number 1115 of "200" from the packet queue 111 according to the subsequent-page indicator 11335 of the page record 1133 having the page number 1135 of "1". In some embodiments of step S702, when the first stop condition is satisfied and a previous difference (the difference between the previous first sum result 50 and the authorized size) does not reach the size threshold, the controller 11 acquires a corresponding one of the single packet records 1113 from the packet queue 111 according to the subsequent-page indicator 11335 of the last one of the page records 1133 in the previous first sum result 50.

Then, the controller 11 sums the previous first sum result 50, the data size 11133 of the acquired single packet record 1113, and the data size 11133 of each of the subsequent single packet records 1113 one by one to calculate a fourth sum result (step S704). For example, as shown in FIG. 2, assuming that the acquired single packet record 1113 is the single packet record 1113 having the packet number 1115 of "200", the controller 11 sums the previous first sum result 50, the data size 11133 of the single packet record 1113 having the packet number 1115 of "200", and the data size 11133 of each of the subsequent single packet records 1113 (for example, data sizes 11133 of the single packet records 1113 having packet numbers 1115 of "201", "202" . . . ) to calculate the fourth sum result.

After summing the fourth sum result one by one, the controller 11 determines one by one whether the fourth sum result satisfies a second stop condition (step S706). If the second stop condition is not satisfied, the controller 11 performs step S704 to calculate a new fourth sum result. If the second stop condition is satisfied, the controller 11 uses a previous fourth sum result as the report size (step S708). The second stop condition includes the fourth sum result being greater than the size threshold. In this way, the report size can be quickly calculated by means of a two-stage summation (for example, the first stage is to perform summation in a unit of the page size 11331, and the second stage is to perform summation in a unit of the data size 11133), and the report size is the closest or equal to the maximum report amount.

In some embodiments, before calculation of the first sum result 50 and after the second sum result is calculated one by one (step S402), the controller 11 may also determine whether the second sum result is greater than the size threshold. If the second sum result is not greater than the size threshold, the controller 11 performs step S402. If the second sum result is greater than the size threshold, the controller 11 uses a previous second sum result as the report size. Similarly, after calculating the third sum result one by one (step S500), the controller 11 may also determine whether the third sum result is greater than the size threshold. If the third sum result is not greater than the size threshold, the controller 11 performs step S500. If the third sum result is greater than the size threshold, the controller 11 uses a previous third sum result as the report size.

In some embodiments, according to the passive optical network communication specifications, in the uplink transmission time slot, the optical network devices 10A-10C need to transmit the report size first, and then transmit data (that is, packets) that conforms to or is less than the authorized size. Therefore, before execution of the report procedure, an authorized uploading procedure needs to be performed to determine packets to be transmitted in a current uplink transmission time slot (this is because the authorized size is unnecessarily equal to the report size in the previous uplink transmission time slot), so that the report size in the current uplink transmission time slot can be accurately calculated for the subsequent report procedure.

Figure 8:
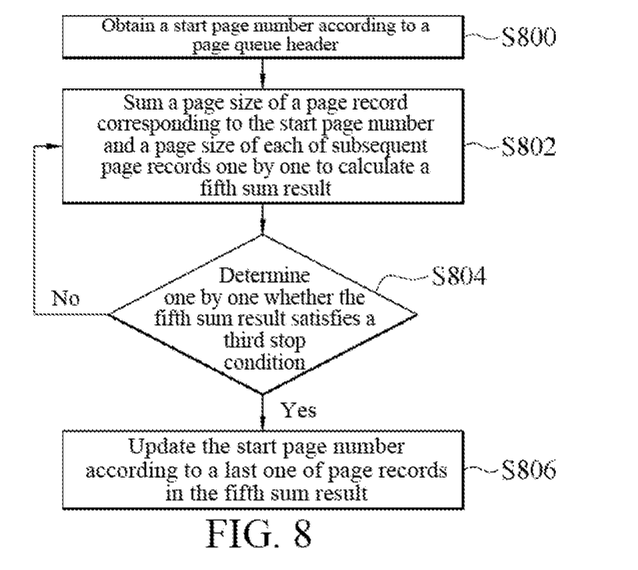
FIG. 8 illustrates a schematic flowchart of an authorized uploading procedure according to some embodiments.

Referring to FIG. 8, FIG. 8 illustrates a schematic flowchart of an authorized uploading procedure according to some embodiments. Similar to FIG. 3 and FIG. 6, in the authorized uploading procedure, the controller 11 obtains a start page number 11311 according to the page queue header 1131 (step S800). Then, the controller 11 sums the page size 11331 of the page record 1133 corresponding to the start page number 11311 and the page size 11331 of each of the subsequent page records 1133 one by one to calculate a fifth sum result 60 (step S802). After calculating the fifth sum result 60 one by one, the controller 11 determines one by one whether the fifth sum result 60 satisfies a third stop condition (step S804). If the third stop condition is not satisfied, the controller 11 performs step S802 to calculate a new fifth sum result 60. A difference between the authorized uploading procedure in FIG. 8 and the report procedures in FIG. 3 and FIG. 6 is that the third stop condition includes the fifth sum result 60 being greater than the authorized size. When the third stop condition is satisfied, the controller 11 updates the start page number 11311 according to a last one of the page records 1133 in the fifth sum result 60 (step S806). For example, as shown in FIG. 2, when the third stop condition is satisfied, assuming that the fifth sum result 60 is obtained when the summation proceeds to the page size 11331 of the page record 1133 having the page number 1135 of "2", the controller 11 updates the start page number 11311 to "2" for subsequently performing the report procedure. In other words, in the report procedure, the report size is calculated by performing summation from the page size 11331 of the page record 1133 having the page number 1135 of "2". In this way, packets to be transmitted in a current uplink transmission time slot can be the closest to or equal to the authorized size. For example, the controller 11 uses packets corresponding to a previous the fifth sum result 60 as the packets to be transmitted in the current uplink transmission. In addition, on this basis, the controller 11 can accurately calculate the report size for the current uplink transmission time slot.

Figure 9:
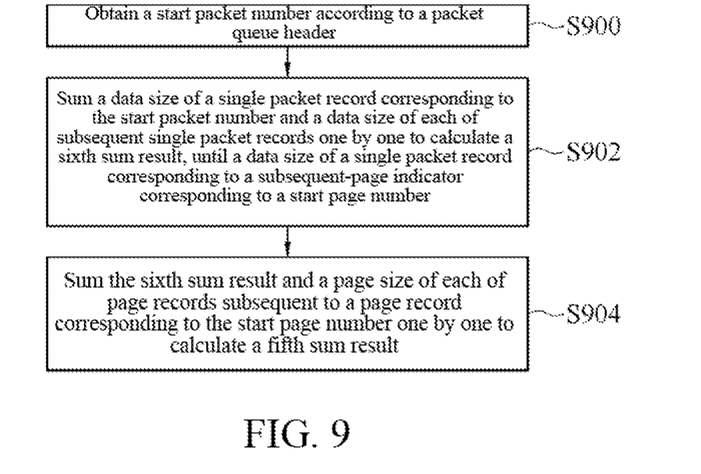
FIG. 9 illustrates a schematic flowchart of an authorized uploading procedure according to some embodiments.

Referring to FIG. 9, FIG. 9 illustrates a schematic flowchart of an authorized uploading procedure according to some embodiments. Similar to FIG. 4, in the authorized uploading procedure, the controller 11 obtains a start packet number 11111 according to the packet queue header 1111 (step S900). Then, when the page-full flag 11333 corresponding to the start page number 11311 is an underfull value, the controller 11 sums the data size 11133 of the single packet record 1113 corresponding to the start packet number 11111 and the data size 11133 of each of the subsequent single packet records 1113 one by one to calculate a sixth sum result, until the data size 11133 of the single packet record 1113 corresponding to the subsequent-page indicator 11335 corresponding to the start page number 11311 (step S902). Similar to FIG. 4, compared to step S802, in step S904, the controller 11 sums the sixth sum result and the page size 11331 of each of the page records 1133 subsequent to the page record 1133 corresponding to the start page number 11311 one by one, to calculate the fifth sum result 60.

Figure 10:
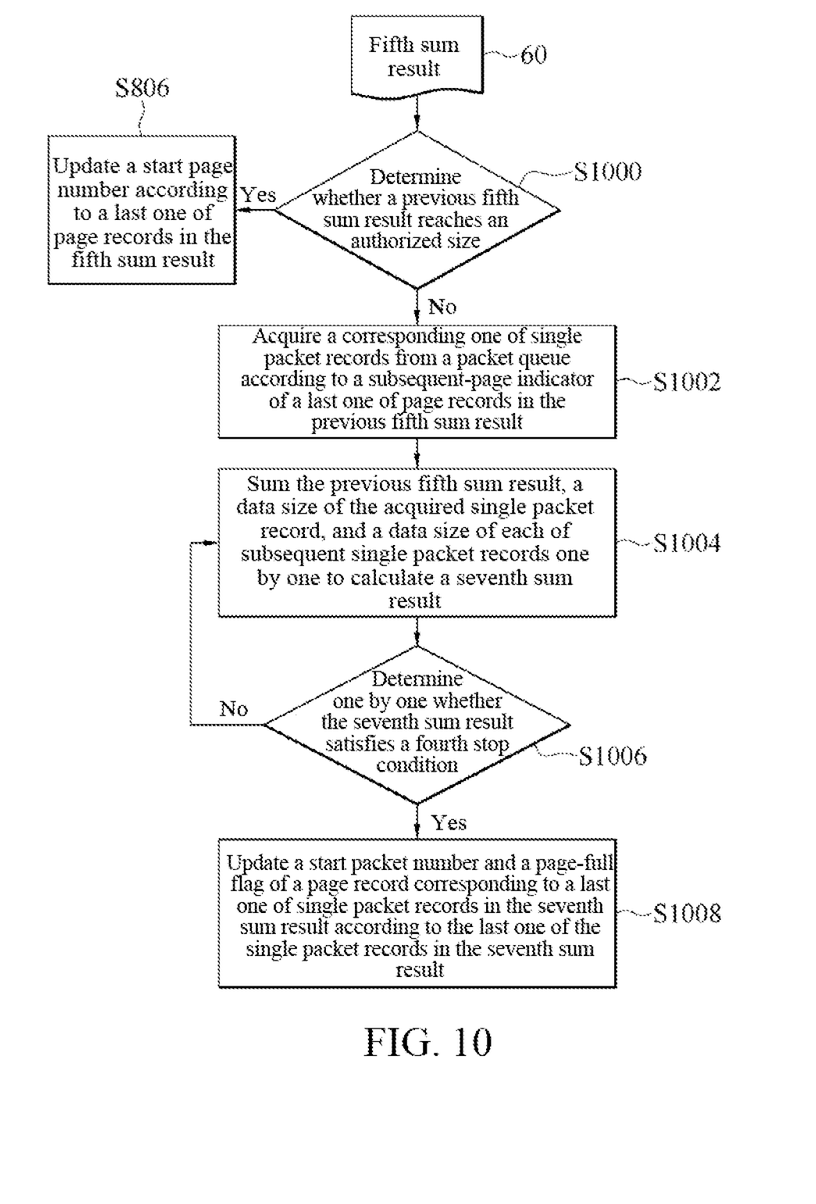
FIG. 10 illustrates a schematic flowchart of an authorized uploading procedure according to some embodiments.

Referring to FIG. 10, FIG. 10 illustrates a schematic flowchart of an authorized uploading procedure according to some embodiments. Similar to FIG. 7, in the authorized uploading procedure, when the third stop condition is satisfied, the controller 11 determines whether the previous fifth sum result 60 reaches the authorized size (step S1000). If the previous fifth sum result 60 reaches the authorized size, the controller 11 performs step S806. If the previous fifth sum result 60 does not reach the authorized size, the controller 11 obtains a corresponding one of the single packet records 1113 from the packet queue 111 according to the subsequent-page indicator 11335 of the last one of the page records 1133 in the previous fifth sum result 60 (step S1002). Then, the controller 11 sums the previous fifth sum result 60, the data size 11133 of the acquired single packet record 1113, and the data size 11133 of each of the subsequent single packet records 1113 one by one to calculate a seventh sum result (step S1004). After calculating the seventh sum result one by one, the controller 11 determines one by one whether the seventh sum result satisfies a fourth stop condition (step S1006). The fourth stop condition includes the seventh sum result being greater than the authorized size. If the fourth stop condition is not satisfied, the controller 11 performs step S1004. If the fourth stop condition is satisfied, the controller 11 updates a start packet number 11111 and a page-full flag 11333 of the page record 1133 corresponding to a last one of the single packet records 1113 in the seventh sum result according to the last one of the single packet records 1113 in the seventh sum result (step S1008).

For example, when the third stop condition is satisfied and the previous fifth sum result 60 does not reach the size threshold, assuming that the previous fifth sum result 60 is obtained when the summation proceeds to the page size 11331 of the page record 1133 having the page number 1135 of "1", the subsequent-page indicator 11335 of the page record 1133 having the page number 1135 of "1" corresponds to the single packet record 1113 having a packet number 1115 of "200". Therefore, the controller 11 acquires the single packet record 1113 having the packet number 1115 of "200" from the packet queue 111 according to the subsequent-page indicator 11335 of the page record 1133 having the page number 1135 of "1". After that, the controller 11 sums the previous fifth sum result 60, the data size 11133 of the single packet record 1113 having the packet number 1115 of "200", and the data size 11133 of each of the subsequent single packet records 1113 (for example, the data sizes 11133 of the single packet records 1113 having packet numbers 1115 of "201", "202" . . . ) one by one, to calculate the seventh sum result. If the fourth stop condition is satisfied when the summation proceeds to the data size 11133 of the single packet record 1113 having the packet number 1115 of "202", the controller 11 updates the start packet number 11111 to "202". In addition, the controller 11 updates the page-full flag 11333 of the page record 1133, having the page number 1135 of "2", corresponding to the single packet record 1113 having the package number 1115 of "202" to an underfull value. In this way, in the report procedure, the report size can be accurately calculated based on the updated start page number 11311, the updated start packet number 11111, and the updated page-full flag 11333.

In some embodiments of step S1008, if the last one of the single packet records 1113 in the seventh sum result corresponds to the start single packet record of the page record 1133, the controller 11 updates the page-full flag 11333 of the page record 1133 corresponding to the last one of the single packet records 1113 in the seventh sum result to a full value. Otherwise, the controller updates the page-full flag 11333 to an underfull value. For example, during the summation for the seventh sum result, if the fourth stop condition is satisfied when the summation proceeds to the data size 11133 of the single packet record 1113 having the packet number 1115 of "200", the controller 11 updates the start packet number 11111 to "200". As shown in FIG. 2, the single packet record 1113 having the packet number 1115 of "200" is the start single packet record of the page record 1133 having the page number 1135 of "2". Therefore, the controller 11 updates the page-full flag 11333 of the page record 1133, having the page number 1135 of "2", corresponding to the single packet record 1113 having the package number 1115 of "200" to a full value.

In some embodiments, before calculation of the fifth sum result 60 and before calculating the sixth sum result (step S902), the controller 11 may also determine whether the sixth sum result is greater than the authorized size. If the sixth sum result is not greater than the authorized size, the controller 11 performs step S902. If the sixth sum result is greater than the authorized size, the controller 11 updates, according to a last one of the single packet records 1113 in the sixth sum result, the start packet number 11111 and the page-full flag 11333 of the page record 1133 corresponding to the last one of the single packet records 1113 in the sixth sum result. Similar to the foregoing embodiment of step S1008, if the last one of the single packet records 1113 in the sixth sum result corresponds to the start single packet record of the page record 1133, the controller 11 updates the page-full flag 11333 of the page record 1133 corresponding to the last one of the single packet records 1113 in the sixth sum result to a full value. Otherwise, the controller updates the page-full flag 11333 to an underfull value.

In some embodiments, if the sum of the data sizes 11133 of all of the single packet records 1113 in the packet queue 111 or the sum of the page sizes 11331 of all of the page records 1133 in the page queue 113 is not greater than the authorized size, the controller 11 updates all stored packets to the optical line terminal 20 in a current uplink transmission time slot.

Figure 11:
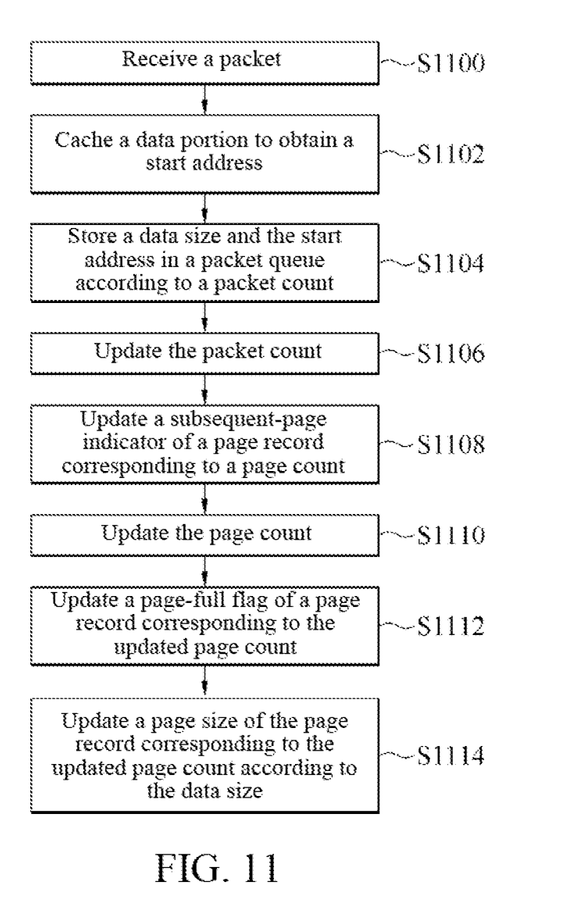
FIG. 11 illustrates a schematic flowchart of a packet receiving procedure according to some embodiments.

Referring to FIG. 11, FIG. 11 is a schematic flowchart of a packet receiving procedure according to some embodiments. In some embodiments, when the optical network devices 10A-10C receive packets from corresponding ones of the user terminal devices 40A-40C, the controller 11 performs the packet receiving procedure. In the packet receiving procedure, the controller 11 first receives a packet (step S1100). The packet includes a data portion, and the data portion has a data size 11133. The data portion may be a part in the packet other than a header, such as a data body (a payload). Next, the controller 11 caches the data portion to obtain a start address 11131 (step S1102). In some embodiments, as shown in FIG. 1, each of the optical network devices 10A-10C further includes a buffer 14. The controller 11 controls the buffer 14 to cache the data portion to obtain the start address 11131. The start address 11131 is a start end of a physical address set stored in the buffer 14 for the data portion. The buffer 14 may be a volatile storage medium, a non-volatile storage medium, or a combination thereof. The volatile storage medium is a random access memory, for example. The non-volatile storage media medium is a read-only memory, for example.

After obtaining the start address 11131, the controller 11 stores the data size 11133 and the start address 11131 in the packet queue 111 according to the packet count 11113 (step S1104). Next, the controller 11 updates the packet count 11113 (step S1106). For example, the controller 11 increments the packet count 11113 by one count. The packet count 11113 is accumulated by the controller 11. The packet count 11113 may be stored in the packet queue header 1111. The packet count 11113 is configured to accumulate a quantity of single packet records 1113 in the packet queue 111. In other words, the packet count 11113 is configured to define a last one of single packet records 1113 in the packet queue 111. For example, as shown in FIG. 2, assuming that the packet count 11113 is "304", it means that the packet queue 111 includes 305 single packet records 1113, and the packet count 11113 corresponds to the single packet record 1113 having the packet number 1115 of "304". In some embodiments of step S1104, the data size 11133 is stored in the single packet record 1113 corresponding to an updated packet count 11113, and the start address 11131 is stored in the single packet record 1113 corresponding to the packet count 11113 before the updating. By means of the data structure, the single packet records 1113 can be serialized together in the packet queue 111 by using the start addresses 11131 stored therein.

After updating the packet count 11113, the controller 11 updates the subsequent-page indicator 11335 of the page record 1133 corresponding to the page count 11313 (step S1108). For example, as shown in FIG. 2, assuming that the updated packet count 11113 is "300", and the current page count 11313 is "101100011$|_{BIN}$", the controller 11 associates the single packet record 1113 having the packet number 1115 of "300" and the subsequent-page indicator 11335 of the page record 1133 having a page number 1135 of "2$|_{DEC}$". For another example, assuming that the updated packet count 11113 is "301", and the current page count 11313 is "110000000$|_{BIN}$", the controller 11 associates the single packet record 1113 having the packet number 1115 of "300" and the subsequent-page indicator 11335 of the page record 1133 having a page number 1135 of "3$|_{DEC}$". In some embodiments, since the single packet records 1113 in the packet queue 111 are serialized together by using the start addresses 11131, the subsequent-page indicator 11335 may store the start address 11131 to point to the associated single packet record 1113. Specifically, the subsequent-page indicator 11335 may be store a start address 11131 of a single packet record 1113 previous to the associated single packet record 1113. For example, if the subsequent-page indicator 11335 of the page record 1133 having the page number 1135 of "2$|_{DEC}$" is associated with the single packet record 1113 having the packet number 1115 of "300", the subsequent-page indicator 11335 may store a start address 11131 of a single packet record 1113 having a packet number 1115 of "299", to point to the single packet record 1113 having the packet number 1115 of "300".

After updating the subsequent-page indicator 11335, the controller 11 updates the page count 11313 (step S1110). For example, the controller increments the page count 11313 by one count. In some embodiments of step S1110, the controller 11 further determines whether a second bit value in the page count 11313 (which is configured to indicate a quantity of packets or a quantity of single packet records 1113 corresponding to the last one of the page records 1133 in the page queue 113) reaches the preset full threshold minus one. For example, assuming that the preset full threshold is "100", the controller 11 determines whether the second bit value in the page count 11313 reaches "99". If the preset full threshold minus one is reached, the controller 11 increments a first bit value in the page count 11313 (which is configured to indicate the page number 1135 of the last one of the page records 1133 in the page queue 113) by one. Then, the controller 11 returns the second bit value to zero. If the preset full threshold value minus one is not reached, the controller 11 increments the second bit value in the page count 11313 by one.

Next, the controller 11 updates the page-full flag 11333 of the page record 1133 corresponding to the updated page count 11313 (step S1112). For example, the controller 11 divides the updated packet count 11113 by the preset full threshold. If an obtained remainder is the preset full threshold minus one, the controller 11 updates the page-full flag 11333 of the page record 1133 corresponding to the updated page count 11313 to a full value. If the obtained remainder is not the preset full threshold minus one, the controller 11 updates the page-full flag 11333 of the page record 1133 corresponding to the updated page count 11313 to an underfull value. For example, assuming that the preset full threshold is "100", if the obtained remainder is "99", the page-full flag 11333 is updated to the full value, or if the obtained remainder is not "99", the page-full flag 11333 is updated to the underfull value. However, the present invention is not limited thereto. Whether to update the page-full flag 11333 to the full value or the underfull value may also be determined by using a quotient and a carry method.

After updating the page-full flag 11333, the controller 11 updates, according to the data size 11133, the page size 11331 of the page record 1133 corresponding to the updated page count 11313 (step S1114). Specifically, the controller 11 updates the page size 11331 by adding the page size 11331 to the data size 11133 to form a new page size 11331 (the updated page size 11331). For example, as shown in FIG. 2, assuming that the updated packet count 11113 is "299", and the updated page count 11313 is "101100011$\|_{BIN}$", the controller 11 adds the data size 11133 of the single packet record 1113 having the packet number 1115 of "299" to the page size 11331 of the page record 1133 having the page number of "2" to form a new page size 11331. In other words, the new page size 11331 accumulates the data sizes 11133 of the single packet records 1113 having the packet numbers 1115 from "200" to "299". Therefore, in the report procedure, the report size can be quickly calculated by using the page size 11331.

In conclusion, according to some embodiments, by summing the page sizes (for example, a plurality of single packets are classified into a plurality of packet groups, and summation is performed in a unit of one packet group), an amount of remaining to-be-uploaded data can be quickly calculated, to ensure that a next allowable data amount of a link terminal (such as the optical line terminal) is sufficient, thereby improving uplink transmission efficiency of the network device (the optical network device). In some embodiments, when a quantity of single packets in the packet group does not reach an upper limit (the preset full threshold), data sizes of the single packets may be summed (for example, summation is performed in a unit of one single packet), so that a time required to calculate the amount of to-be-uploaded data can be shortened.

What is claimed is:

1. An uplink data transmission method for a communication device, comprising:
   performing a report procedure, wherein the report procedure comprises:
   obtaining a start page number according to a page queue header of a page queue, wherein the page queue has a plurality of page records in sequence, the start page number corresponds to one of the page records, each of the page records comprises a page size, and the page size is a sum of data sizes of packets corresponding to the page record;
   summing the page size of the page record corresponding to the start page number and the page size of each of the subsequent page records one by one to calculate a first sum result; and
   reporting the first sum result as a report size of data to be uploaded by the communication device.

2. The uplink data transmission method of claim 1, wherein each of the page records further comprises a page-full flag and a subsequent-page indicator.

3. The uplink data transmission method of claim 2, wherein the report procedure further comprises:
   obtaining a start packet number according to a packet queue header of a packet queue, wherein the packet queue has a plurality of single packet records in sequence, the start packet number corresponds to one of the single packet records, each of the single packet records comprises a data size of a different packet, and the subsequent-page indicator corresponds to one of the single packet records; and
   when the page-full flag corresponding to the start page number is an underfull value, summing the data size of the single packet record corresponding to the start packet number and the data size of each of the subsequent single packet records one by one to calculate a second sum result, until the data size of the single packet record corresponding to the subsequent-page indicator corresponding to the start page number, wherein
   the step of calculating the first sum result comprises summing the second sum result and the page size of each of the page records subsequent to the page record corresponding to the start page number one by one to calculate the first sum result.

4. The uplink data transmission method of claim 2, wherein a plurality of single packet records in sequence define a packet queue, each of the single packet records comprises a data size of a different packet, the subsequent-page indicator corresponds to one of the single packet records, and when the page-full flag of the page record corresponding to a page count is an underfull value, the step of calculating the first sum result comprises:
   summing the page size of the page record corresponding to the start page number and the page size of each of the subsequent page records one by one to calculate a third sum result, until the page size of the page record corresponding to the page count, wherein the page count is configured to define a last one of the page records in the page queue; and
   summing the third sum result, the data size of the single packet record corresponding to the subsequent-page indicator of the page record previous to the page record corresponding to the page count, and the data size of each of the subsequent single packet records one by one to calculate the first sum result.

5. The uplink data transmission method of claim 1, wherein the report procedure further comprises:
   after the calculating the first sum result one by one, determining one by one whether the first sum result satisfies a first stop condition, wherein the first stop condition comprises the first sum result being greater than a size threshold, wherein
   when the first stop condition is satisfied, using a previous first sum result as the report size.

6. The uplink data transmission method of claim 5, wherein the step of reporting the report size comprises:
   when the first stop condition is satisfied and the previous first sum result does not reach the size threshold, acquiring a single packet record from a packet queue according to the subsequent-page indicator of a last one of the page records in the previous first sum result, wherein the packet queue comprises a plurality of single packet records in sequence, and each of the single packet records comprises a data size of a different packet;

summing the previous first sum result, the data size of the acquired single packet record, and the data size of each of the subsequent single packet records one by one to calculate a fourth sum result, and determining one by one whether the fourth sum result satisfies a second stop condition, wherein the second stop condition comprises the fourth sum result being greater than the size threshold; and when the second stop condition is satisfied, using a previous fourth sum result as the report size.

7. The uplink data transmission method of claim 1, further comprising:

receiving an authorization message, wherein the authorization message comprises an authorized size; and performing an authorized uploading procedure, wherein the authorized uploading procedure comprises:

obtaining the start page number according to the page queue header;

summing the page size of the page record corresponding to the start page number and the page size of each of the subsequent page records one by one to calculate a fifth sum result, and determining one by one whether the fifth sum result satisfies a third stop condition, wherein the third stop condition comprises the fifth sum result being greater than the authorized size; and when the third stop condition is satisfied, updating the start page number according to a last one of the page records in the fifth sum result.

8. The uplink data transmission method of claim 7, wherein the authorized uploading procedure further comprises:

when the third stop condition is satisfied and the previous fifth sum result does not reach the authorized size, acquiring a single packet record from a packet queue according to the subsequent-page indicator of a last one of the page records in the previous fifth sum result, wherein the packet queue comprises a plurality of single packet records in sequence, and each of the single packet records comprises a data size of a different packet;

summing the previous fifth sum result, the data size of the acquired single packet record, and the data size of each of the subsequent single packet records one by one to calculate a seventh sum result, and determining one by one whether the seventh sum result satisfies a fourth stop condition, wherein the fourth stop condition comprises the seventh sum result being greater than the authorized size; and when the fourth stop condition is satisfied, updating a start packet number and a page-full flag of the page record corresponding to a last one of the single packet records in the seventh sum result according to the last one of the single packet records.

9. The uplink data transmission method of claim 1, further comprising:

performing a packet receiving procedure, wherein the packet receiving procedure comprises:

receiving a packet, wherein the packet comprises a data portion having the data size;

caching the data portion and obtaining a start address;

storing the data size and the start address in a packet queue according to a packet count, wherein the packet queue has a plurality of single packet records in sequence;

updating the packet count, wherein the packet count is configured to define a last one of the single packet records in the packet queue;

updating a subsequent-page indicator of the page record corresponding to a page count according to the updated packet count, wherein the page count is configured to define a last one of the page records in the page queue;

updating the page count;

updating a page-full flag of the page record corresponding to the updated page count; and updating the page size of the page record corresponding to the updated page count according to the data size.

10. The uplink data transmission method of claim 9, wherein the data size is stored in the single packet record corresponding to the updated packet count, and the start address is stored in the single packet record corresponding to the packet count before the updating.

11. A network device, comprising:

a controller storing a page queue, wherein the page queue comprises a page queue header and a plurality of page records in sequence, each of the page records comprises a page size, the page size is a sum of data sizes of packets corresponding to the page record, and the controller is configured to perform a report procedure comprising:

obtaining a start page number according to the page queue header, wherein the start page number corresponds to one of the page records;

summing the page size of the page record corresponding to the start page number and the page size of each of the subsequent page records one by one to calculate a first sum result; and reporting the first sum result as a report size of data to be uploaded by the network device.

12. The network device of claim 11, wherein each of the page records further comprises a page-full flag and a subsequent-page indicator.

13. The network device of claim 12, wherein the controller stores a packet queue, the packet queue comprises a packet queue header and a plurality of single packet records in sequence, each of the single packet records comprises the data size of a different packet, the subsequent-page indicator corresponds to one of the single packet records, and the report procedure further comprises:

obtaining a start packet number according to the packet queue header, wherein the start packet number corresponds to one of the single packet records; and when the page-full flag corresponding to the start page number is an underfull value, summing the data size of the single packet record corresponding to the start packet number and the data size of each of the subsequent single packet records one by one to calculate a second sum result, until the data size of the single packet record corresponding to the subsequent-page indicator corresponding to the start page number, wherein the step of calculating the first sum result comprises summing the second sum result and the page size of each of the page records subsequent to the page record corresponding to the start page number one by one to calculate the first sum result.

14. The network device of claim 12, wherein the controller stores a packet queue, the packet queue comprises a packet queue header and a plurality of single packet records in sequence, each of the single packet records comprises the data size of a different packet, the subsequent-page indicator corresponds to one of the single packet records, and when the page-full flag of the page record corresponding to a page count is an underfull value, the step of calculating the first sum result comprises:
  summing the page size of the page record corresponding to the start page number and the page size of each of the subsequent page records one by one to calculate a third sum result, until the page size of the page record corresponding to the page count, wherein the page count is configured to define a last one of the page records in the page queue; and
  summing the third sum result, the data size of the single packet record corresponding to the subsequent-page indicator of the page record previous to the page record corresponding to the page count, and the data size of each of the subsequent single packet records one by one to calculate the first sum result.

15. The network device of claim 11, wherein the report procedure further comprises:
  after the calculating the first sum result one by one, determining one by one whether the first sum result satisfies a first stop condition, wherein the first stop condition comprises the first sum result being greater than a size threshold, wherein
  the step of reporting the report size comprises: when the first stop condition is satisfied, using a previous first sum result as the report size.

16. The network device of claim 15, wherein each of the page records further comprises a subsequent-page indicator, the controller stores a packet queue, the packet queue comprising a plurality of single packet records in sequence, each of the single packet records comprises the data size of a different packet, the subsequent-page indicator corresponds to one of the single packet records, and the step of reporting the report size comprises:
  when the first stop condition is satisfied and the previous first sum result does not reach the size threshold, acquiring a corresponding one of the single packet records from the packet queue according to the subsequent-page indicator of a last one of the page records in the previous first sum result;
  summing the previous first sum result, the data size of the acquired single packet record, and the data size of each of the subsequent single packet records one by one to calculate a fourth sum result, and determining one by one whether the fourth sum result satisfies a second stop condition, wherein the second stop condition comprises the fourth sum result being greater than the size threshold; and
  when the second stop condition is satisfied, using a previous fourth sum result as the report size.

17. The network device of claim 11, wherein the controller receives an authorization message and performs an authorized uploading procedure, the authorization message comprises an authorized size, and the authorized uploading procedure comprises:
  obtaining the start page number according to the page queue header;
  summing the page size of the page record corresponding to the start page number and the page size of each of the subsequent page records one by one to calculate a fifth sum result, and determining one by one whether the fifth sum result satisfies a third stop condition, wherein the third stop condition comprises the fifth sum result being greater than the authorized size; and
  when the third stop condition is satisfied, updating the start page number according to a last one of the page records in the fifth sum result.

18. The network device of claim 17, wherein each of the page records further comprises a subsequent-page indicator, the controller stores a packet queue, the packet queue comprises a plurality of single packet records in sequence, each of the single packet records comprises the data size of a different packet, the subsequent-page indicator corresponds to one of the single packet records, and the authorized uploading procedure further comprises:
  when the third stop condition is satisfied and the previous fifth sum result does not reach the authorized size, acquiring a corresponding one of the single packet records from the packet queue according to the subsequent-page indicator of a last one of the page records in the previous fifth sum result;
  summing the previous fifth sum result, the data size of the acquired single packet record, and the data size of each of the subsequent single packet records one by one to calculate a seventh sum result, and determining one by one whether the seventh sum result satisfies a fourth stop condition, wherein the fourth stop condition comprises the seventh sum result being greater than the authorized size; and
  when the fourth stop condition is satisfied, updating a start packet number and a page-full flag of the page record corresponding to a last one of the single packet records in the seventh sum result according to the last one of the single packet records.

19. The network device of claim 11, further comprising a buffer, wherein the controller stores a packet queue and performs a packet receiving procedure, the packet queue has a plurality of single packet records in sequence, and the packet receiving procedure comprises:
  receiving a packet, wherein the packet comprises a data portion having the data size;
  controlling the buffer to cache the data portion and obtaining a start address;
  storing the data size and the start address in the packet queue according to a packet count;
  updating the packet count, wherein the packet count is configured to define a last one of the single packet records in the packet queue;
  updating a subsequent-page indicator of the page record corresponding to a page count according to the updated packet count, wherein the page count is configured to define a last one of the page records in the page queue;
  updating the page count;
  updating a page-full flag of the page record corresponding to the updated page count; and
  updating the page size of the page record corresponding to the updated page count according to the data size.

20. The network device of claim 19, wherein the data size is stored in the single packet record corresponding to the updated packet count, and the start address is stored in the single packet record corresponding to the packet count before the updating.

* * * * *